US012639084B2

(12) United States Patent
Huck et al.

(10) Patent No.: US 12,639,084 B2
(45) Date of Patent: May 26, 2026

(54) ACTIVITY-BASED USER INTERFACE PERSONALIZATION

(71) Applicant: Disney Enterprises, Inc., Burbank, CA (US)

(72) Inventors: Lori L. Huck, Los Angeles, CA (US); Audrey Coyote Aura Beard, Brooklyn, NY (US); Michelle M. Phillips, Los Angeles, CA (US); Aileen Watson, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 94 days.

(21) Appl. No.: 18/215,007

(22) Filed: Jun. 27, 2023

(65) Prior Publication Data

US 2025/0004795 A1 Jan. 2, 2025

(51) Int. Cl.
*G06F 9/451* (2018.01)
*G06F 3/048* (2013.01)
(Continued)

(52) U.S. Cl.
CPC .............. *G06F 9/451* (2018.02); *G06F 3/048* (2013.01); *G06F 3/04847* (2013.01);
(Continued)

(58) Field of Classification Search
CPC ...... G06F 9/451; G06F 3/048; G06F 3/04847; G06F 3/0485; G06Q 30/0251;
(Continued)

(56) References Cited

U.S. PATENT DOCUMENTS 10,866,719 B1 * 12/2020 Bulusu .................... H04L 51/52
11,917,214 B1 * 2/2024 Bell-Geddes ...... H04N 21/2187
(Continued)

FOREIGN PATENT DOCUMENTS

WO    WO 2021/236575 A1    11/2021

OTHER PUBLICATIONS

Jude Martinez "A Study of Colour as an Attitude that Intensifies User's Engagement in Game Plays" The International Journal of Multimedia & Its Applications Apr. 2012 21 Pgs.
(Continued)

*Primary Examiner* — Ting Z Lee
(74) *Attorney, Agent, or Firm* — Farjami & Farjami LLP

(57) ABSTRACT

A system includes a computing platform including a hardware processor and a system memory storing a software code providing a user interface (UI) having a plurality of default parameters. The hardware processor is configured to execute the software code to receive interaction data describing interactions by a user with media content, identify, using the interaction data, at least one of a video characteristic or an audio characteristic of the media content, and determine, using the at least one of the video characteristic or the audio characteristic, one or more aesthetic preferences of the user. The hardware processor is further configured to execute the software code to modify, using the one or more aesthetic preferences of the user, one or more of the plurality of default parameters of the UI to generate a personalized UI for the user and provide the personalized UI to the user.

12 Claims, 4 Drawing Sheets

(51) Int. Cl.

| | |
|---|---|
| *G06F 3/04847* | (2022.01) |
| *G06F 3/0485* | (2022.01) |
| *G06N 20/00* | (2019.01) |
| *G06Q 30/0251* | (2023.01) |
| *H04N 21/25* | (2011.01) |
| *H04N 21/466* | (2011.01) |

(52) U.S. Cl.
CPC ........... *G06F 3/0485* (2013.01); *G06N 20/00* (2019.01); *G06Q 30/0251* (2013.01); *G06Q 30/0255* (2013.01); *G06Q 30/0269* (2013.01); *G06Q 30/0271* (2013.01); *H04N 21/251* (2013.01); *H04N 21/466* (2013.01); *H04N 21/4668* (2013.01)

(58) Field of Classification Search
CPC ........... G06Q 30/0255; G06Q 30/0269; G06Q 30/0271; G06N 20/00; H04N 21/466; H04N 21/4668; H04N 21/251

See application file for complete search history.

(56) References Cited

U.S. PATENT DOCUMENTS

| | | | | |
|---|---|---|---|---|
| 2017/0109585 | A1* | 4/2017 | Matias | ............. H04N 21/44204 |
| 2017/0262164 | A1* | 9/2017 | Jain | ...................... G06F 3/04847 |
| 2019/0187870 | A1* | 6/2019 | Bostick | ............... G06F 3/04886 |
| 2019/0187952 | A1* | 6/2019 | Lal | ........................... G10L 15/26 |
| 2019/0228439 | A1* | 7/2019 | Anthony | ............ G06Q 30/0271 |
| 2020/0136580 | A1* | 4/2020 | Renner | ............ H04N 21/44224 |
| 2021/0073458 | A1* | 3/2021 | Sugaya | ................. G06F 16/285 |
| 2021/0217437 | A1* | 7/2021 | Tang | ....................... G10L 15/08 |
| 2021/0294582 | A1* | 9/2021 | Accardo | .................. G06N 3/08 |
| 2021/0312502 | A1* | 10/2021 | Goodsitt | ............... G06N 20/00 |
| 2023/0195788 | A1* | 6/2023 | Zhang | .................. G06F 16/635 |
| | | | | 700/94 |
| 2023/0388596 | A1* | 11/2023 | Bhattacharya | ..... H04N 21/4826 |

OTHER PUBLICATIONS

"Cinematography Color Palette of Film: The Impact of Color and Its Use by Cinematographers" Student Filmmakers Magazine Sep. 16, 2019 16 Pgs.
"5 way to Create a Film Color Palette: How to Use Color in Film" MasterClass Jun. 22, 2021 5 pgs.

* cited by examiner

Figure 2:
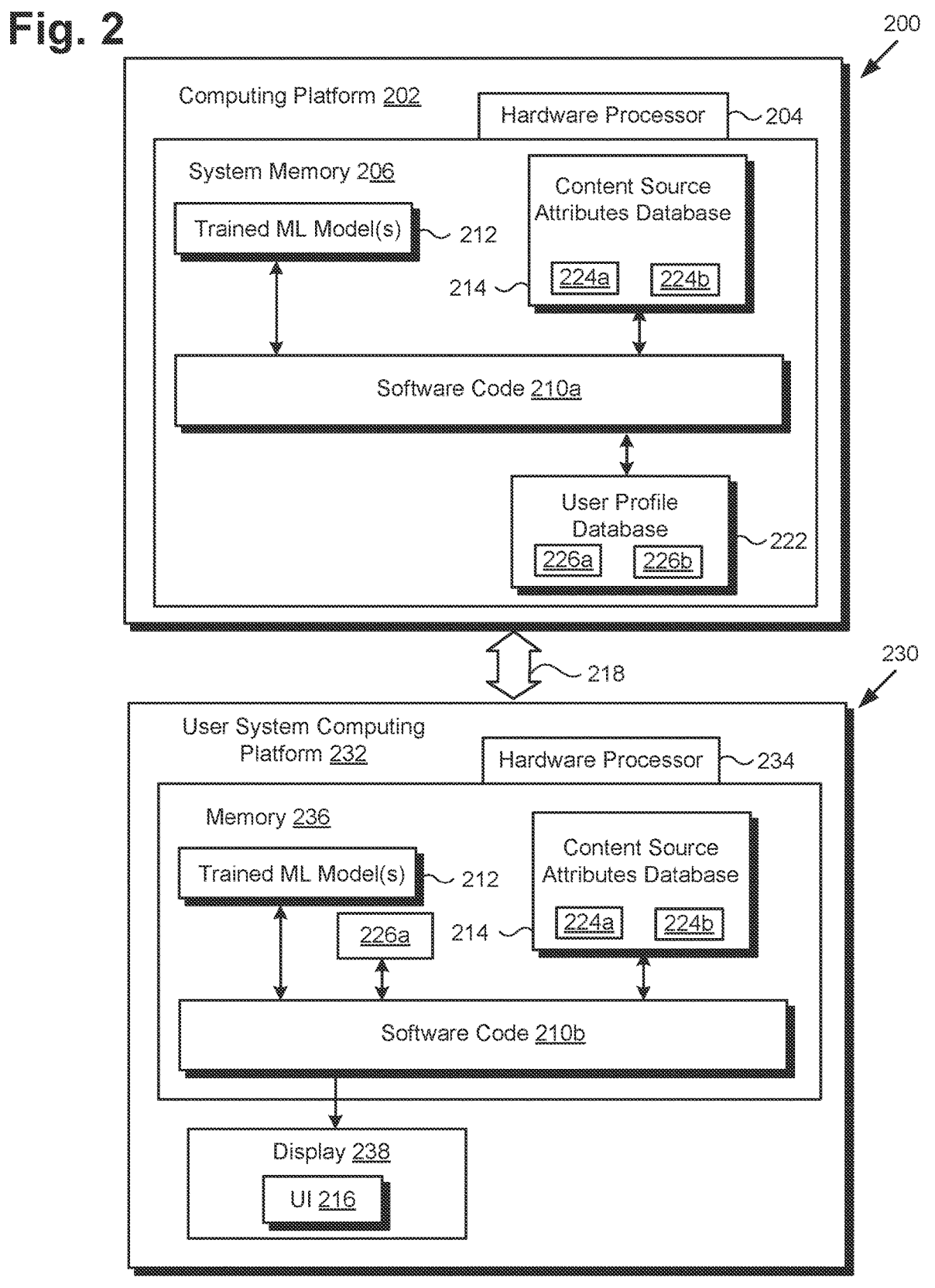

Computing Platform 202

Hardware Processor ~204

System Memory 206

Trained ML Model(s) ~212

Content Source Attributes Database

214 ~ | 224a | 224b |

Software Code 210a

User Profile Database

| 226a | 226b | ~222

218

230

User System Computing Platform 232

Hardware Processor ~234

Memory 236

Trained ML Model(s) ~212

| 226a |

214 ~

Content Source Attributes Database

| 224a | 224b |

Software Code 210b

Display 238

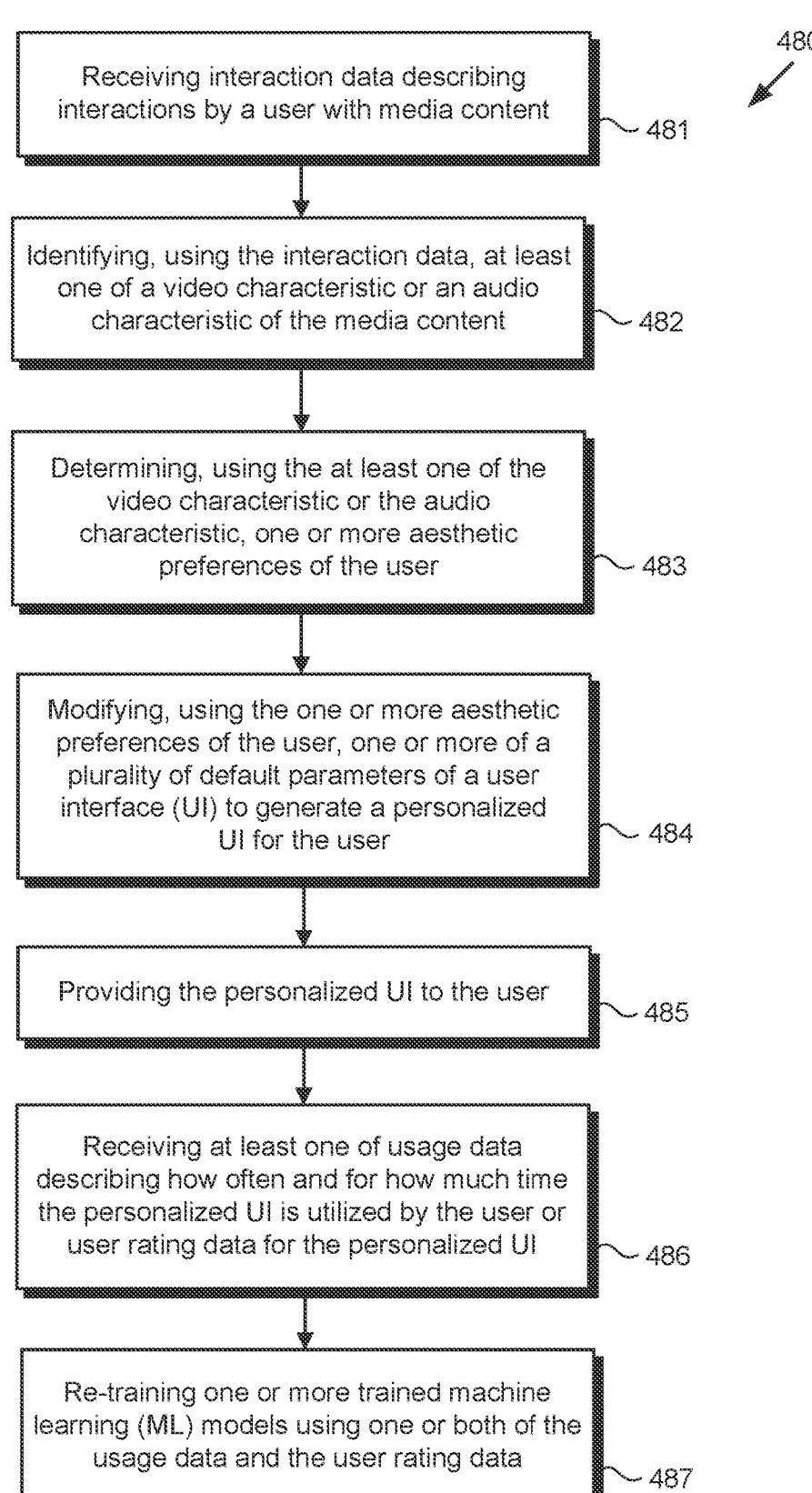

480

Receiving interaction data describing interactions by a user with media content ~ 481

Identifying, using the interaction data, at least one of a video characteristic or an audio characteristic of the media content ~ 482

Determining, using the at least one of the video characteristic or the audio characteristic, one or more aesthetic preferences of the user ~ 483

Modifying, using the one or more aesthetic preferences of the user, one or more of a plurality of default parameters of a user interface (UI) to generate a personalized UI for the user ~ 484

Providing the personalized UI to the user ~ 485

Receiving at least one of usage data describing how often and for how much time the personalized UI is utilized by the user or user rating data for the personalized UI ~ 486

Re-training one or more trained machine learning (ML) models using one or both of the usage data and the user rating data ~ 487

ACTIVITY-BASED USER INTERFACE PERSONALIZATION

BACKGROUND

Digital media content in a variety of different types is available to consumers from content sources including streaming services, social media platforms, multi-user gaming platforms, and sites hosting virtual worlds, for example. Moreover, each different type of digital media content is typically offered by a plurality of providers in competition with one another for market share and user loyalty.

One way in which a particular digital media content provider may seek to enhance the experience of a user interacting with that provider, and thereby engender user loyalty, is to identify the consumption preferences of different users and curate the digital media content offered to each user based on those individual preferences. Such a practice is advantageous for users because it reduces the necessity for the user to manually search through a typically large library of available content in order to find content likely to be new and yet appealing to that user. However, in so far as most digital media content providers presently engage in this practice, users increasingly take content curation for granted and fail to recognize it as a special benefit. Thus, in order to enhance the experience of users seeking digital media content, there is a need in the art for a new user interaction solution providing a user environment responsive to the aesthetic preferences of individual users so as to increase the immersiveness and enjoyment of users who utilize that environment.

BRIEF DESCRIPTION OF THE DRAWINGS

FIG. 2 shows a diagram including a more detailed representation of a user system configured to perform activity-based UI personalization, according to one implementation;

FIG. 4 shows a flowchart outlining an exemplary method for performing activity-based UI personalization, according to one implementation.

DETAILED DESCRIPTION

Figure 1:
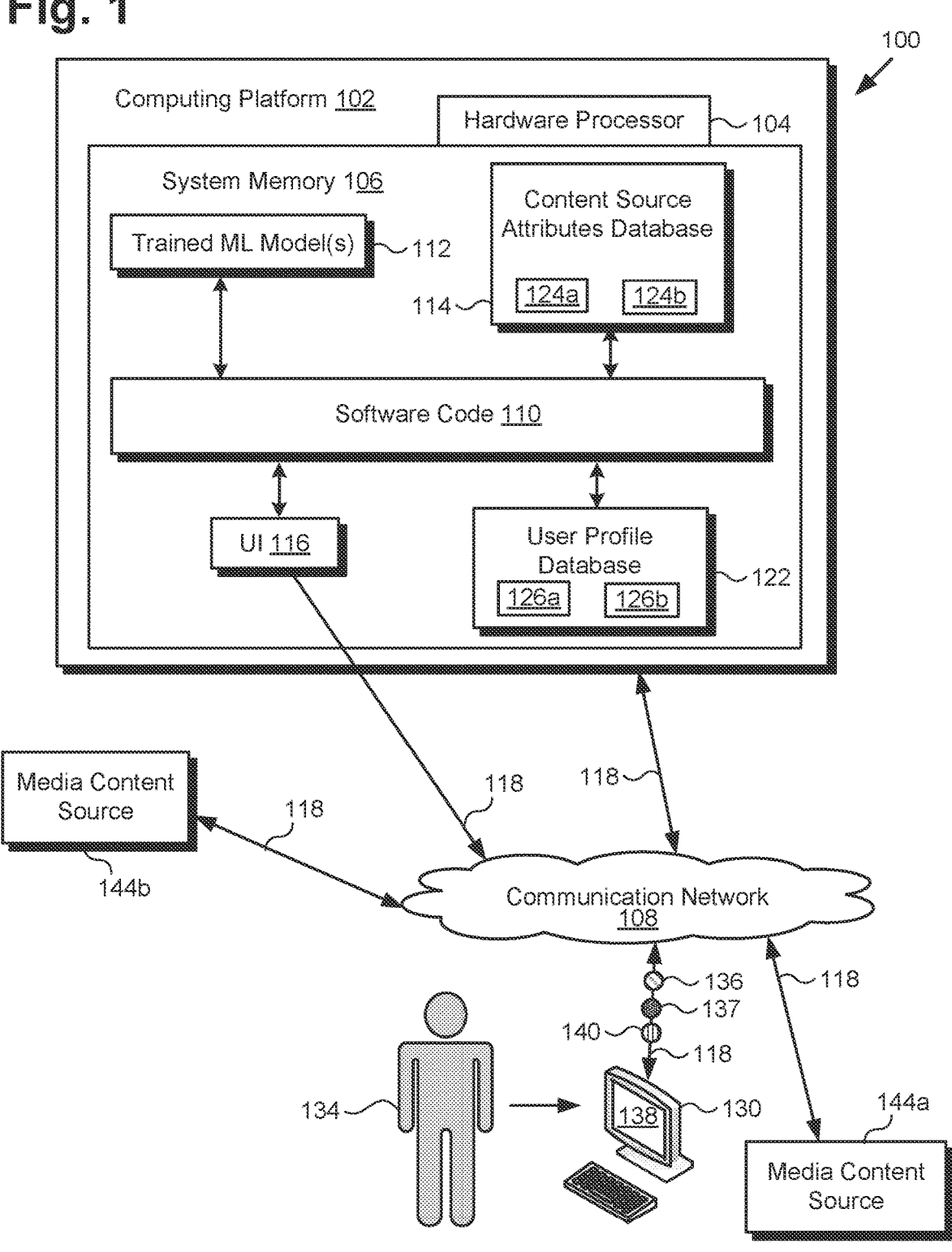
FIG. 1 shows an exemplary system for performing activity-based user interface (UI) personalization, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, digital media content in a variety of different types is available to consumers from content sources including streaming services, social media platforms, multi-user gaming platforms, and sites hosting virtual worlds, for example. Moreover, each different type of digital media content is typically offered by a plurality of providers in competition with one another for market share and user loyalty.

As further noted above, one way in which a particular digital media content provider may seek to enhance the experience of a user interacting with that provider, and thereby engender user loyalty, is to identify the consumption preferences of different users and curate the digital media content offered to each user based on those individual preferences. Such a practice is advantageous for users because it reduces the necessity for the user to manually search through a typically large library of available content in order to find content likely to be new and yet appealing to that consumer. However, in so far as most digital media content providers presently engage in this practice, users increasingly take content curation for granted and fail to recognize it as a special benefit. Thus, and as also noted above, in order to enhance the experience of users seeking digital media content, there is a need in the art for a new user interaction solution providing a user environment responsive to the aesthetic preferences of individual users, such as scrolling speed and acceleration, color palette, and visual contrast for example, so as to increase the immersiveness and enjoyment of users who utilize that environment.

The present application discloses systems and methods for performing activity-based user interface (UI) personalization that addresses the need in the art described above. Moreover, the user interaction solution disclosed by the present application can advantageously be implemented as automated systems and methods. As defined in the present application, the terms "automation," "automated," and "automating" refer to systems and processes that do not require the participation of a human system administrator. Although, in some implementations, a system administrator may review or modify the personalized UIs generated by the automated systems and according to the automated methods described herein, that human involvement is optional. Thus, in some implementations, the methods described in the present application may be performed under the control of hardware processing components of the disclosed automated systems.

As disclosed herein, the present activity-based UI personalization solution employs one or more machine learning models specifically trained to predict one or more of a plurality of aesthetic preferences of a user. The complexity involved in performing such inferential predictions accurately, in real-time with respect to activities by a user, makes human performance of the present solution within feasible timeframes impossible, even with the assistance of the processing and memory resources of a general purpose computer.

As defined in the present application, the expression "machine learning model" or "ML model" may refer to a mathematical model for making future predictions based on patterns learned from samples of data or "training data." For example, machine learning models may be trained to perform image processing, natural language understanding (NLU), and other inferential data processing tasks. Various learning algorithms can be used to map correlations between input data and output data. Such an ML model may include one or more logistic regression models, Bayesian models, or artificial neural networks (NNs). A "deep neural network," in the context of deep learning, may refer to an NN that utilizes multiple hidden layers between input and output layers, which may allow for learning based on features not explicitly defined in raw data. It is noted that any NNs referred to in the present application refer to deep NNs.

Examples of the types of digital media content (hereinafter "media content") with which a user may interact using the present activity-based UI personalization solution may include audio-video (AV) content having both audio and video components, audio unaccompanied by video, and video unaccompanied by audio. In addition, or alternatively, in some implementations, the type of media content with which a user may interact using the present activity-based UI personalization solution may be or include digital representations of persons, fictional characters, locations, objects, and identifiers such as brands and logos, for example, which populate a virtual reality (VR), augmented reality (AR), or mixed reality (MR) environment.

Moreover, the media content with which a user may interact using the present activity-based UI personalization solution may depict virtual worlds that can be experienced by any number of users synchronously and persistently, while providing continuity of data such as personal identity, user history, entitlements, possessions, payments, and the like. It is noted that such media content may also include content that is a hybrid of traditional AV and fully immersive VR/AR/MR experiences, such as interactive video. That is to say, the media content with which a user may interact using the present activity-based UI personalization solution may include interactive video providing one or more of a VR, AR, or MR experience to the user.

It is also noted that, as defined in the present application, the term "shot," when used to describe video or AV content, refers to a sequence of frames of video that are captured from a unique camera perspective without cuts or other cinematic transitions. In addition, as defined in the present application, the terms "inter-shot" or "scene," as applied to video or AV content, refers to a transition amongst two or more shots that together deliver a single, complete and unified dramatic element of film narration, or block of storytelling within a film.

FIG. 1 shows an exemplary system for performing activity-based UI personalization, according to one implementation. As shown in FIG. 1, system 100 includes computing platform 102 having hardware processor 104 and system memory 106 implemented as a computer-readable non-transitory storage medium. According to the present exemplary implementation, system memory 106 stores software code 110, one or more trained machine learning (ML) models 112 (hereinafter "trained ML model(s) 112"), and, in some implementations, one or both of user profile database 122 including media content interaction histories 126a and 126b of individual system users and content source attributes database 114 including attribute libraries 124a and 124b identifying modifiable UI attributes available from respective media content sources 144a and 144b.

Moreover, although FIG. 1 shows two media content sources 144a and 144b, that representation is provided merely by way of example. More generally, the present novel and inventive concepts are applicable to use cases in which there is a single media content source, or multiple media content sources, such tens, dozens, or hundreds of media content sources, such as streaming services, social media platforms, multi-user gaming platforms, and sites hosting virtual worlds, to name a few, each with its own constraints on UI personalization.

As further shown in FIG. 1, system 100 is implemented within a user environment including communication network 108, media content sources 144a and 144b, and user system 130 including display 138. In addition, FIG. 1 shows user 134 of user system 130 and system 100, interaction data 136, usage data 137, and user rating data 140. Also shown in FIG. 1 are activity-based personalized UI 116 for user 134 provided by system 100, and network communication links 118 of communication network 108 interactively connecting system 100 with user system 130 and media content sources 144a and 144b.

It is noted that in some implementations, as shown in FIG. 1, content source attributes database 114 may be stored in system memory 106. However, in other implementations, content source attributes database 114 may not be a component of system 100, but may be remotely accessible to system 100 via communication network 108 and network communication links 118. It is further noted that, in some implementations, user profile database 122 may be remote from but communicatively coupled to system 100 via communication network 108 and network communication links 118. However, in other implementations, one or both of content source attributes database 114 and user profile database 122 may be assets of system 100, and may be stored locally in system memory 106, as shown in FIG. 1.

Moreover, although FIG. 1 shows content source attributes database 114 as storing two modifiable UI attribute libraries, and user profile database 122 as storing two media content interaction histories 126a and 126b, those exemplary depictions are also provided merely in the interests of conceptual clarity. More generally, content source attributes database 114 may store modifiable UI attribute libraries for up to ten, dozens, or hundreds of media content sources, such as streaming services, social media platforms, multi-user gaming platforms, and sites hosting virtual worlds, to name a few. In addition, although user profile database 122 is depicted as storing two media content interaction histories 126a and 126b, in practice user profile database 122 may store more than two media content interaction histories, such as hundreds, thousands, or millions of media content interaction histories, for example.

It is further noted that, in some implementations, media content interaction histories 126a and 126b may be exclusive of personally identifiable information (PII) of user 134. Thus, in those implementations, although media content interaction histories 126a and 126b may serve to distinguish one anonymous user from another anonymous user, user profile database 122 may not retain information describing the age, gender, race, ethnicity, or any other PII of user 134. However, in some implementations, such as content subscription service applications, for example, user 134 of system 100 may be provided an opportunity to opt in to having their PII stored.

Although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, although FIG. 1 depicts software code 110, trained (ML) model(s) 112, content source attributes database 114, and user profile database 122, as being co-located in system memory 106 that representation is merely provided as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100. Consequently, in some implementations, one or more of software code 110, trained (ML) model(s) 112, content source attributes database 114, and user profile database 122 may be stored remotely from one another on the distributed memory resources of system 100. It is also noted that, in some implementations, ML model(s) 112 may take the form of software modules included in software code 110.

Hardware processor 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth, for instance. Furthermore, in some implementations, system 100 may be implemented virtually, such as in a data center. For example, in some implementations, system 100 may be implemented in software, or as virtual machines. Moreover, in some implementations, communication network 108 may be a high-speed network suitable for high performance computing (HPC), for example a 10 GigE network or an Infiniband network.

Although user system 130 is shown as a desktop computer in FIG. 1, that representation is also provided merely as an example. More generally, user system 130 may be any suitable mobile or stationary computing device or system that implements data processing capabilities sufficient to support connections to communication network 108, enable use of activity-based personalized UI 116, and implement the functionality ascribed to user system 130 herein. For example, in other implementations, user system 130 may take the form of a laptop computer, tablet computer, smart TV, game platform, smartphone, smart wearable device, such as a smartwatch, or an AR or VR device, for example.

Display 138 of user system 130 may take the form of a liquid crystal display (LCD), a light-emitting diode (LED) display, an organic light-emitting diode (OLED) display, a quantum dot (QD) display, or any other suitable display screen that performs a physical transformation of signals to light. It is noted that, in some implementations, display 138 may be integrated with user system 130, such as when user system 130 takes the form of a laptop or tablet computer for example. However, in other implementations, for example where user system 130 takes the form of a computer tower in combination with a desktop monitor, display 138 may be communicatively coupled to, but not physically integrated with user system 130.

FIG. 2 shows a diagram including a more detailed representation of user system 230 configured to perform activity-based UI personalization, according to one implementation. According to the exemplary implementation shown in FIG. 2, user system 230 is interactively connected to system 200 over network communication link 218.

As shown in FIG. 2, user system 230 includes user system computing platform 232 having hardware processor 234 and system memory 236 implemented as a computer-readable non-transitory storage medium storing software code 210b, one or more trained machine learning (ML) models 212 (hereinafter "trained ML model(s) 212"), and media content interaction history 226a of a user of user system 230, such as user 134 in FIG. 1. As further shown in FIG. 2, in some implementations system memory 236 may optionally store content source attributes database 214 including attribute libraries 224a and 224b identifying modifiable UI attributes available from respective media content sources, for example, media content sources 144a and 144b in FIG. 1. In addition, user system 230 includes display 238 on which activity-based personalized UI 216 may be rendered.

As also shown in FIG. 2, system 200 includes computing platform 202 having hardware processor 204 and system memory 206 implemented as a computer-readable non-transitory storage medium. According to the present exemplary implementation, system memory 206 stores software code 210a, trained ML model(s) 212, and, in some implementations, one or both of user profile database 222 including media content interaction histories 226a and 226b of individual system users and content source attributes database 214 including attribute libraries 224a and 224b identifying modifiable UI attributes available from respective media content sources, for example, media content sources 144a and 144b in FIG. 1.

Network communication link 218, system 200 including computing platform 202 having hardware processor 204 and system memory 206, trained ML model(s) 212, user profile database 222, media content interaction histories 226a and 226b, content source attributes database 214, and attribute libraries 224a and 224b correspond respectively in general to network communication links 118, system 100 including computing platform 102 having hardware processor 104 and system memory 106, trained ML model(s) 112, user profile database 122, media content interaction histories 126a and 126b, content source attributes database 114, and attribute libraries 124a and 124b, in FIG. 1. Thus, network communication links 118, system 100 including computing platform 102 having hardware processor 104 and system memory 106, trained ML model(s) 112, user profile database 122, media content interaction histories 126a and 126b, content source attributes database 114, and attribute libraries 124a and 124b may share any of the characteristics attributed to respective network communication link 218, system 200 including computing platform 202 having hardware processor 204 and system memory 206, trained ML model(s) 212, user profile database 222, media content interaction histories 226a and 226b, content source attributes database 214, and attribute libraries 224a and 224b by the present disclosure, and vice versa.

In addition, software code 210a corresponds in general to software code 110, in FIG. 1, while activity-based personalized UI 216 corresponds in general to activity-based personalized UI 116. Consequently, software code 210a and activity-based personalized UI 216 may share any of the characteristics attributed to respective software code 110 and activity-based personalized UI 116 by the present disclosure, and vice versa.

User system 230 having display 238 corresponds in general to user system 130 having display 138, in FIG. 1. Thus, user system 230 and display 238 may share any of the characteristics attributed to user system 130 and display 138 by the present disclosure. That is to say, like user system 130, user system 230 may take the form of a desktop computer, laptop computer, tablet computer, smart TV, game platform, smartphone, smart wearable device, such as a smartwatch, or an AR or VR device to name a few examples, while display 238 may be an LCD, an LED display, an OLED display, a QD display, or any other suitable display screen that perform a physical transformation of signals to light.

Moreover, user system 130 may include features corresponding respectively to hardware processor 234, system memory 236 storing software code 210b trained ML model(s) 212, media content interaction history 226a, and optionally content source attributes database 214 including attribute libraries 224a and 224b. Hardware processor 234 of user system 130/230 may include multiple hardware processing units, such as one or more CPUs, one or more GPUs, and one or more TPUs, as those features are described above, as well as one or more FPGA, and custom hardware for machine-learning training or inferencing, for example.

With respect to software code 210b, it is noted that in some implementations, software code 210b may be a thin client application of software code 110/210a. In those implementations, software code 210b may enable user system 130/230 to provide interaction data 136 and one or more of usage data 137 and user rating data 140 to system 100 for processing, and to receive and render activity-based personalized UI 116/216 using display 138/238. However, in other implementations, software code 210b may include substantially all of the features and functionality of software code 110/210a. In some of those latter implementations, user system 130/230 may be configured as a standalone system for performing activity-based UI personalization using trained ML model(s) 112/212.

According to the exemplary implementation shown in FIG. 2, software code 210b is located in system memory 236 of user system 130/230, subsequent to transfer of software code 210b to user system 130/230 over a packet-switched network, such as the Internet, for example, or subsequent to transfer from an external computer-readable non-transitory storage medium. Once present on user system 130/230, software code 210b may be persistently stored in system memory 236 and may be executed locally on user system 130/230 by hardware processor 234.

Figure 3:
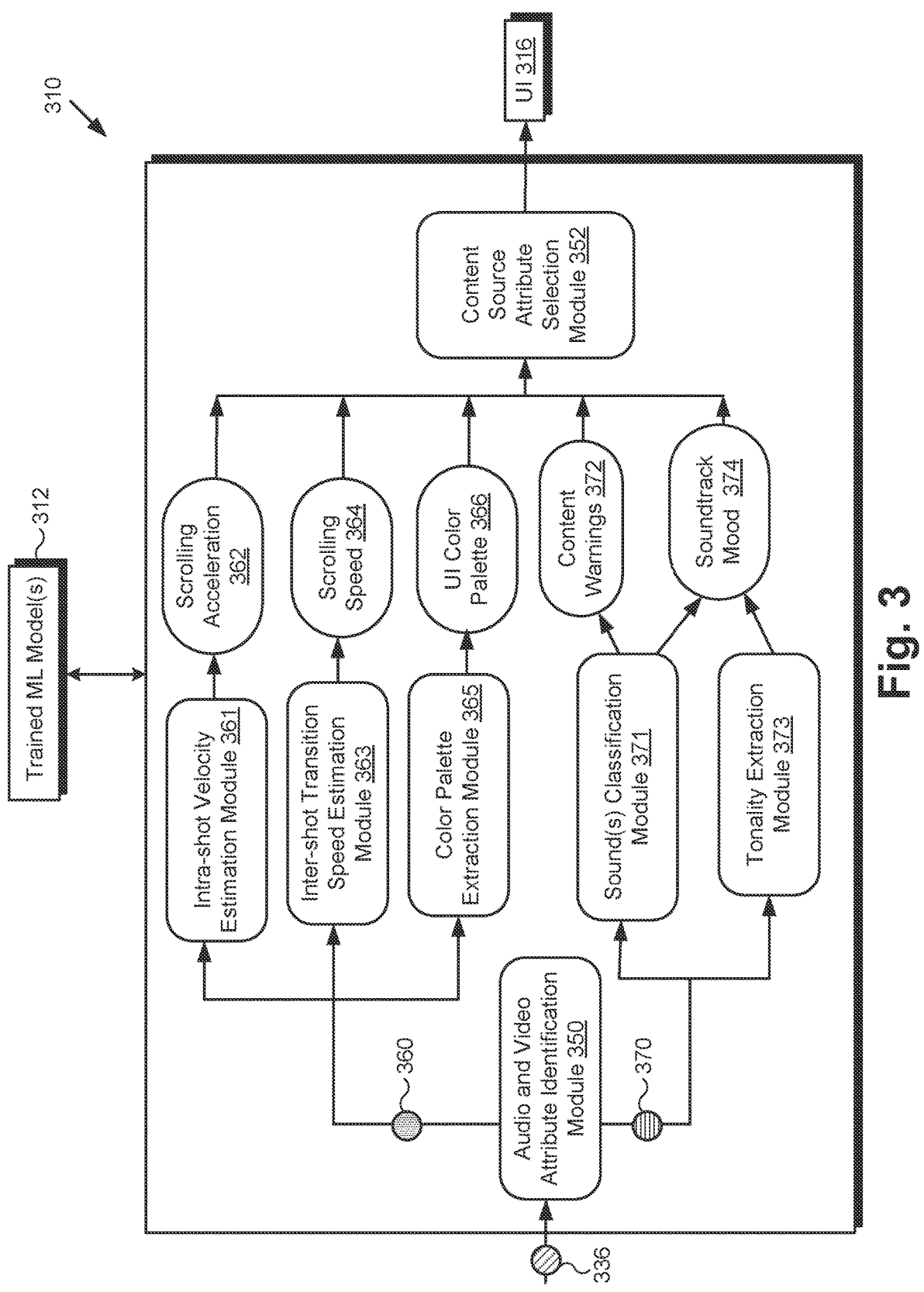
FIG. 3 shows a diagram of an exemplary software code suitable for use by a system to perform activity-based UI personalization, according to one implementation.

FIG. 3 shows a diagram of exemplary software code 310 suitable for use by a system to perform activity-based UI personalization, according to one implementation. According to the exemplary implementation shown in FIG. 3, software code 310 includes audio and video attribute identification module 350 receiving interaction data 336 describing interactions by a user, such as user 134 in FIG. 1, with media content, and to identify one or more video characteristics 360 of the media content, one or more audio characteristics 370 of the media content, or one or more video characteristics 360 and one or more audio characteristics 370 of the media content using interaction data 336. In addition, software code 310 may further include one or more of (i) intra-shot velocity estimation module 361, inter-shot shot transition speed estimation module 363, and color palette extraction module 365 for processing one or more video characteristics 360 to respectively determine scrolling acceleration 362, scrolling speed 364, and UI color palette 366 for activity-based personalized UI 316 for the user.

As further shown in FIG. 3, software code 310 may also include one or more of sound or sounds classification module 371 (hereinafter "sound(s) classification module 371"), which may include one or more sound classifiers each trained or otherwise configured to identify the presence of a particular sound or type of sound, and tonality extraction module 373 for processing one or more audio characteristics 370 to identify one or more content warnings 372 for the user, as well as soundtrack mood 374 determining the mood of audio produced by activity-based personalized UI 316 for the user. Also shown in FIG. 3 are one or more trained machine learning model(s) 312 (hereinafter "trained ML model(s) 312") accessible by software code 310, and optional content source attribute selection module 352 of software code 310. Regarding trained ML model(s) 312, it is noted that in some implementations, trained ML model(s) 312 may take the form of one or more pre-trained NNs, such as pre-trained U-Nets or pre-trained Transformers, for example.

Interaction data 336 corresponds in general to interaction data 136, in FIG. 1, and those corresponding features may share any of the characteristics attributed to either corresponding feature by the present disclosure. Software code 310, trained ML model(s) 312, and activity-based personalized UI 316 correspond respectively in general to software code 110/210a, trained ML model(s) 112/212, and activity-based personalized UI 116/216, in FIGS. 1 and 2. Thus, software code 110/210a, trained ML model(s) 112/212, and activity-based personalized UI 116/216 may share any of the characteristics attributed to respective software code 310, trained ML model(s) 312, and activity-based personalized UI 316 by the present disclosure, and vice versa. Moreover, in some implementations, software code 210b may correspond in general to software code 310 and may share any of the characteristics attributed to software code 310 by the present disclosure. That is to say, although not shown in FIGS. 1 and 2, software code 110/210a, and in some implementations software code 210b, may include features corresponding to audio and video attribute identification module 350, intra-shot velocity estimation module 361, inter-shot shot transition speed estimation module 363, color palette extraction module 365, sound(s) classification module 371, tonality extraction module 373, and content source attribute selection module 352.

The functionality of system 100/200 including software code 110/210a/310, as well as that of user system 130/230 including software code 210b/310, in FIGS. 1, 2, and 3 will be further described by reference to FIG. 4. FIG. 4 shows flowchart 480 presenting an exemplary method for performing activity-based UI personalization, according to one implementation. With respect to the actions outlined in FIG. 4, it is noted that certain details and features have been left out of flowchart 480 in order not to obscure the discussion of the inventive aspects disclosed in the present application.

Referring to FIG. 4 in combination with FIGS. 1 and 3, flowchart 480 begins with receiving interaction data 136/336 describing interactions by user 134 with media content (action 481). For example, user 134 may utilize user system 130 to interact with, e.g., select, activate, view or otherwise consume media content, which may be or include streaming media content, social media content, or streaming media content and social media content. Interaction data 136/336 may identify the media content with which user 134 interacts, as well as the nature of the interaction. In the case AV content, for example, interaction data 136/336 may include how much time user 134 spends viewing the media content, whether viewing of the media content occurs in a single session or is interrupted, whether the media content is viewed in its entirety, whether user 134 pauses or terminates viewing of the media content to navigate to other media content, whether user 134 views the media content a second or subsequent time, and the like.

As noted above, examples of the types of media content with which user 134 may include AV content having both audio and video components, audio unaccompanied by video, and video unaccompanied by audio. In addition, or alternatively, in some implementations, the type of media content with which user 134 interacts may be or include digital representations of persons, fictional characters, locations, objects, and identifiers such as brands and logos, for example, which populate a VR, AR, or MR environment.

Moreover, and as further noted above, the media content with which user 134 interacts may depict virtual worlds that can be experienced by any number of users synchronously and persistently, while providing continuity of data such as personal identity, user history, entitlements, possessions, payments, and the like, of user 134. It is noted that such media content may also include content that is a hybrid of traditional AV and fully immersive VR/AR/MR experiences, such as interactive video. That is to say, the media content with which user 134 interacts may include interactive video providing one or more of a VR, AR, or MR experience to user 134.

As shown by FIGS. 1, 2, and 3, in some implementations interaction data 136/336 may be received from user 134 by system 100 via user system 130, communication network 108, and network communication links 118. In those implementations, interaction data 136/336 may be received by software code 110/210a/310, executed by hardware processor 104/204 of computing platform 102/202. As further shown by FIGS. 2 and 3, in other implementations interaction data 336 may be received by software code 210b/310, executed by hardware processor 234 of user system 230.

Continuing to refer to FIGS. 1, 3, and 4 in combination, flowchart 480 further includes identifying, using interaction data 136/336, at least one or more video characteristics 360 or one or more audio characteristics 370 of the media content (action 482). It is noted that although action 482 refers to identifying at least one or more video characteristics 360 or one or more audio characteristics 370 of the media content, in some use cases one or more video characteristics 360 and one or more audio characteristics 370 of the media content may be identified in action 482.

In use cases in which one or more video characteristics 360 is/are identified in action 482, that/those one or more video characteristics may include one or more of intra-shot velocity, inter-shot transition speed, or the color palette of the media content. It is noted that these video characteristics can be identified numerically based on interaction data

136/336. For example, intra-shot velocity refers to how rapidly action appears to occur within a shot, and may be identified using intra-shot velocity estimation module 361 and motion vectors of the media content with which user 134 interacts. For example, intra-shot velocity estimation module 361 may receive pairs of video frames that are adjacent in time as inputs and may produce motion vectors using any conventional motion vector estimation techniques. The median vector magnitude of the estimated motion vectors may be used as a scaling factor for a base acceleration coefficient.

Inter-shot transition speed refers to the rate at which shot transitions occur and may be identified using inter-shot transition speed estimation module 363 and shot boundary timestamps of the media content. For example, inter-shot transition speed estimation module 363 may receive video as an input and may calculate the median time between cuts using any conventional shot or scene boundary estimation techniques. The median time in seconds between cuts may be used as a scaling factor for speed.

The color palette of the media content may be identified using color palette extraction module 365 and red-green-blue (RGB) histograms of the media content. The RGB histograms may be aggregated over substantially all content consumed by a particular user. According to one implementation, color palette extraction module 365 may use the RGB histogram of pixels in reference to color matching. saturated or muted colors, brightness, and the like, for activity-based personalized UI 116/216/316. Moreover, in some implementations identifying the color palette of the media content may further include identifying the brightness of the media content, based for example on average frame or pixel brightness, as well the visual contrast of the media content.

Alternatively, or in addition, in use cases in which one or more audio characteristics 370 is/are identified in action 482, that/those one or more audio characteristics may include one or more of specific types of sound included in the media content, and the tonality of the media content. It is noted that, as defined for the purposes of the present application, the term "tonality" refers to the mood produced by the audio soundtrack of the media content, as determined by one or more dominant musical keys of the soundtrack and/or the relations between the notes of a scale or key. These audio characteristics can also be identified numerically based on interaction data 136/336. For example, sounds included in the media content, such as gunshots, laughter, or engine revving for example, may be classified as such using sound(s) classification module 371, which may in turn utilize a sound classification ML model included among trained ML model(s) 112/212/312. The tonality of the media content may be identified using tonality extraction module 373 and audio spectrograms of the media content.

As shown by FIGS. 1, 2, and 3, in some implementations identification of at least one or more video characteristics 360 or one or more audio characteristics 370 of the media content using interaction data 136/336 may be performed, in action 482, by software code 110/210a/310, executed by hardware processor 104/204 of computing platform 102/202, and using audio and video attribute identification module 350 and one or more of intra-shot velocity estimation module 361, inter-shot shot transition speed estimation module 363, color palette extraction module 365, sound(s) classification module 371, and tonality extraction module 373. As further shown by FIGS. 2 and 3, in other implementations, action 482 may be performed by software code 210b/310, executed by hardware processor 234 of user system 230, and using audio and video attribute identification module 350 and one or more of intra-shot velocity estimation module 361, inter-shot shot transition speed estimation module 363, color palette extraction module 365, sound(s) classification module 371, and tonality extraction module 373 as described above.

Continuing to refer to FIGS. 1, 3, and 4 in combination, flowchart 480 further includes determining, using the at least one of one or more video characteristics 360 or one or more audio characteristics 370, one or more aesthetic preferences of user 134 (action 483). For example, in use cases in which one or more video characteristics 360 is/are identified in action 482, the one or more aesthetic preferences of user 134 determined in action 483 may include at least one of scrolling acceleration 362, minimum scrolling speed 364, maximum scrolling speed 364, and UI color palette 366 of activity-based personalized UI 116/216/316, where the color palette may include minimum and maximum UI brightness, visual contrast, or both UI brightness and visual contrast. With respect to scrolling acceleration, it is noted that there may be a predetermined range of scrolling acceleration (e.g., low, medium, high) that is calculated by an aggregate of the shot transitions and/or intra-shot velocities of the content consumed by the user, which can correlate to the speed of the carousel of content provided by activity-based personalized UI 116/216/316.

Alternatively, or in addition, in use cases in which one or more audio characteristics 370 is/are identified in action 482, the one or more aesthetic preferences of user 134 may include a preference to be warned of predetermined sound effects before they are audibly played, such as gunshots, screams, or other potentially frightening or disturbing sounds for example, as well as soundtrack mood 374 of activity-based personalized UI 116/216/316. For example, different users can set up filters through their preferences identifying certain sounds that the do not want to hear, such as gunshots or screams instances, in their UI personalization. Content can be filtered out or warnings set accordingly.

According to some implementations, determining the one or more aesthetic preferences of user 134 may further use the media content interaction history of user 134. For example, in use cases in which media content interaction history 126a/226a is describes the media consumption history of user 134, media content interaction history 126a/226a may include some of historical user behavior described above by reference to action 481 during the consumption of other media content, such as the particular media content titles consumed by user 134, how long user 134 tends to watch media content they have selected, as well as a favorites list, watch list, and media content ratings identified or provided by user 134.

As shown by FIGS. 1, 2, and 3, in some implementations determination of the one or more aesthetic preferences of user 134 using one or more video characteristics 360 and/or one or more audio characteristics 370 identified in action 482, may be performed, in action 483, by software code 110/210a/310, executed by hardware processor 104/204 of computing platform 102/202, and using one or more of trained ML model(s) 112/212/312, and in some implementations a media content interaction history stored on user profile database 122/222. As further shown by FIGS. 2 and 3, in other implementations, action 483 may be performed by software code 210b/310, executed by hardware processor 234 of user system 230, and using one or more of trained ML model(s) 212/312, and in some implementations media content interaction history 226a of the user of user system 230.

Continuing to refer to FIGS. 1, 3, and 4 in combination, flowchart 480 further includes modifying, using the one or more aesthetic preferences of user 134 determined in action 483, one or more of a plurality of default parameters of a generic UI to generate activity-based personalized UI 116/216/316 for user 134 (action 484). For example, where user 134 consumes mostly action movies, with rapid inter-shot transition speeds and high intra-shot velocities, muted colors, and science fiction elements, the color scheme, scrolling speed and acceleration, and UI element shapes of activity-based personalized UI 116/216/316 may be modified to reflect the predicted aesthetic preferences of user 134. Alternatively, if user 134 typically consumes nature documentaries instead, activity-based personalized UI 116/216/316 may have a more naturalistic color scheme with rounded UI element shapes, and slower scrolling speed and acceleration, among other attributes. Regarding UI element shapes, it is noted that there may be a predetermined control set of shapes that correspond respectively to specific color palettes and score sounds of the content consumed by the user. A dark horror film may match to sharp edged shapes; a bright, primary color nature film with a melodic score will typically match to more rounded edge shapes.

According to some implementations, modifying the one or more of the plurality of default parameters of the generic UI, in action 484 may be further based on the platform providing the media content. For example, as noted above the media content with which user 134 interacts may include streaming media content provided by a media content source hosting a streaming service platform, social media content provided by a media content source hosting a social media platform, game content provided by a media content source hosting a multi-user gaming platform, and virtual world content provided by a media content source providing a platform hosting such a virtual world, for example. In those implementations, system 100/200 may include content source attributes database 114/214 including attribute libraries 124a/224a and 124b/224b, or user system 130/230 may include content source attributes database 214 including attribute libraries 224a and 224b, identifying which default parameters of the UIs provided by each media content source, such as media content sources 144a and 144b is/are modifiable when generating activity-based personalized UI 116/216/316, and which parameters are not modifiable.

As shown by FIGS. 1, 2, and 3, in some implementations activity-based personalized UI 116/216/316 may be generated, in action 483, by software code 110/210a/310, executed by hardware processor 104/204 of computing platform 102/202, using content source attribute selection module 352, and in some implementations, an attribute library stored on content source attributes database 114/214. As further shown by FIGS. 2 and 3, in other implementations, action 484 may be performed by software code 210b/310, executed by hardware processor 234 of user system 230, using content source attribute selection module 352, and in some implementations an attribute library stored on content source attributes database 114/214.

As noted above, the audio and video characteristics of the media content with which user 134 chooses to interact can be characterized numerically. By quantifying these characteristics and aggregating them in time, dominant themes of the media content characteristics preferred by user 134 can be identified by computing the statistical mode of the distributions, and a UI can be personalized for user 134 by seeding it with those apparent preferences. In the case of a multi-modal distribution of dominant modes, the present UI personalization solution may cycle between dominant modes, or may implement a tie-breaking heuristic based on most recent consumption by user 134. In the absence of a clear dominant mode, there may be no changes made to the default parameters of a generic UI until a dominant mode emerges based on future interactions by user 134 with other media content.

Continuing to refer to FIGS. 1, 3, and 4 in combination, flowchart 480 further includes providing activity-based personalized UI 116/216/316 to user 134 (action 485). In implementations in which activity-based personalized UI 116/216/316 is generated for user 134 by system 100/200 in action 484, hardware processor 104/204 of computing platform 102/202 may execute software code 110/210a/310 to provide activity-based personalized UI 116/216/316 to user 134 by transmitting activity-based personalized UI 116/216/316 to user system 130/230 of user 134 via communication network 108 and network communication links 118/218. Alternatively, in implementations in which activity-based personalized UI 116/216/316 is generated for user 134 by user system 130/230 in action 484, hardware processor 234 of user system computing platform 232 may execute software code 210b/310 to provide activity-based personalized UI 116/216/316 to user 134 by rendering activity-based personalized UI 116/216/316 on display 138/238 of user system 130/230.

In some implementations, the method outlined by flowchart 480 may conclude with action 484 described above. However, as shown by FIG. 4, in some implementations, the actions outlined by flowchart 480 may further include one or both of actions 486 and 487, described in greater detail below. Continuing to refer to FIGS. 1, 3, and 4 in combination, flowchart 480 may further include receiving at least one of usage data 137 describing how often and for how much time the activity-based personalized UI 116/216/316 is utilized by user 134, or user rating data 140 for activity-based personalized UI 116/216/316 (action 486). It is noted that user 134 may retain the option of resetting activity-based personalized UI 116/216/316 to its default parameters, and that act of resetting activity-based personalized UI 116/216/316 may be included in usage data 137. User rating data 140 may rate the enjoyment, by user 134. Usage data 137 may reveal how much more, or how much less, user 134 interacts with media content using activity-based personalized UI 116/216/316 than was the usage history of user 134 prior to the modifications to the default UI parameters performed in action 484 to generate activity-based personalized UI 116/216/316.

As shown by FIG. 1, in some implementations, usage data 137, user rating data 140, or both, may be received from user 134 by system 100 via user system 130, communication network 108, and network communication links 118. In those implementations, one or both of usage data 137 and user rating data 140 may be received by software code 110, executed by hardware processor 104 of computing platform 102. However, referring to FIGS. 1 and 2 in combination, in other implementations, usage data 137, user rating data 140, or both, may be received from user 134 as inputs to user system 130/230. In those implementations, one or both of usage data 137 and user rating data 140 may be received by software code 210b, executed by hardware processor 234 of user system computing platform 232.

It is noted that usage data 137, user rating data 140, or both, provide feedback to system 100/200 or user system 130/230 regarding the predictive performance of trained ML model(s) 112/212. Accordingly, in some implementations in which flowchart 480 includes action 486, flowchart 480 may further include re-training at least one of trained ML model(s) 112/212 using one or both of usage data 137 and user rating data 140 (action 487). The ongoing training of trained ML model(s) 112/212 using instances of one or more of usage data 137 and user rating data 140 received from user 134, can advantageously serve to improve the performance of trained ML model(s) 112/212 over time. Referring to FIGS. 1, 2, and 3 in combination with FIG. 4, In some implementations, re-training of trained ML model(s) 112/212/312 using one or more of usage data 137 and user rating data 140, in action 485, may be performed by software code 110/210a/310, executed by hardware processor 104 of system 100. However, in other implementations re-training of trained ML model(s) 212/312 using one or more of usage data 137 and user rating data 140, in action 485, may be performed by software code 210b/310, executed by hardware processor 234 of user system 130/230.

With respect to the method outlined by flowchart 480, it is emphasized that actions 481, 482, 483, 484, and 485 (hereinafter "actions 481-485"), or actions 481-485 and 486, or actions 481-485 and actions 486 and 487, may be performed in an automated process from which human involvement may be omitted.

Thus, the present application discloses systems and methods for performing activity-based UI personalization. The present UI personalization solution advances the state-of-the-art by analyzing the audio and video characteristics of media content with which a user interacts, as well as the nature of those user interactions, in order to modify default UI parameters to generate a personalized UI for the user. To accomplish this, the novel and inventive systems and methods disclosed herein quantify inter-shot transition speeds and intra-shot velocities, color palettes, tonality of music scores, and the like, to determine aesthetic preferences of the user and adjust the UI in well-defined ways to suit those preferences.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:

a computing platform including a hardware processor and a system memory storing a software code providing a user interface (UI) having a plurality of default parameters;

the hardware processor configured to execute the software code to:

receiving interaction data describing interactions by a user with media content;

identify, using the interaction action, a video characteristic of the media content;

determine, using the video characteristic, one or more aesthetic preferences of the user, wherein the one or more aesthetic preferences of the user comprises at least one of a scrolling acceleration, a minimum scrolling speed, or a maximum scrolling speed;

modify, using the one or more aesthetic preferences of the user, one or more of the plurality of default parameters of the UI to generate a personalized UI for the user; and provide the personalized UI to the user;

wherein the video characteristic comprises at least one of an intra-shot velocity of the media content, or an inter-shot transition speed of the media content.

2. The system of claim 1, wherein the system memory further stores one or more trained machine learning (ML) models, and wherein the software code is configured to use the one or more trained ML models to determine the one or more aesthetic preferences of the user.

3. The system of claim 2, wherein the hardware processor is further configured to execute the software code to:

receive at least one of a usage data describing how often and for how much time the personalized UI is utilized by the user, or a user rating data for the personalized UI; and re-train at least one of the one or more trained ML models using the at least one of the usage data or the user rating data.

4. The system of claim 1, wherein the system memory further stores a user profile database including a media content interaction history of the user, and wherein determining the one or more aesthetic preferences of the user further uses the media content interaction history of the user.

5. The system of claim 1, wherein the media content comprises at least one of streaming media content or social media content, and wherein generating the personalized UI for the user is further based on a platform providing the at least one of the streaming media content or social media content.

6. The system of claim 1, wherein the media content comprises interactive video providing at least one of a virtual reality, augmented reality, or mixed reality experience to the user.

7. A method for use by a system including a computing platform having a hardware processor and a system memory storing a software code providing a user interface (UI) having a plurality of default parameters, the method comprising:

receiving, by the software code executed by the hardware processor, interaction data describing interactions by a user with media content;

identifying, by the software code executed by the hardware processor and using the interaction data, a video characteristic of the media content;

determining, by the software code executed by the hardware processor and using the video characteristic, one or more aesthetic preferences of the user, wherein the one or more aesthetic preferences of the user comprise at least one of a scrolling acceleration, a minimum scrolling speed, or a maximum scrolling speed;

modifying, by the software code executed by the hardware processor and using the one or more aesthetic preferences of the user, one or more of the plurality of default parameters of the UI to generate a personalized UI for the user; and providing, by the software code executed by the hardware processor, the personalized UI to the user;

wherein the video characteristic comprises at least one or an intra-shot velocity of the media content, or an inter-shot transition speed of the media content.

8. The method of claim 7, wherein the system memory further stores one or more trained machine learning (ML) models, and wherein the software code is configured to use the one or more trained ML models in determining the one or more aesthetic preferences of the user.

9. The method of claim 8, further comprising:

receiving, by the software code executed by the hardware processor, at least one of a usage data describing how often and for how much time the personalized UI is utilized by the user or a user rating data for the personalized UI; and re-training, by the software code executed by the hardware processor, at least one of the one or more trained ML models using the at least one of the usage data or the user rating data.

10. The method of claim 7, wherein the system memory further stores a user profile database including a media content interaction history of the user, and wherein determining the one or more aesthetic preferences of the user further uses the media content interaction history of the user.

11. The method of claim 7, wherein the media content comprises at least one of streaming media content or social media content, and wherein generating the personalized UI for the user is further based on a platform providing the at least one of the streaming media content or social media content.

12. The method of claim 7, wherein the media content comprises interactive video providing at least one of a virtual reality, augmented reality, or mixed reality experience to the user.

\* \* \* \* \*